No. 614,351. Patented Nov. 15, 1898.
J. H. SIEBER.
FILTER.
(Application filed Mar. 11, 1898.)
(No Model.)
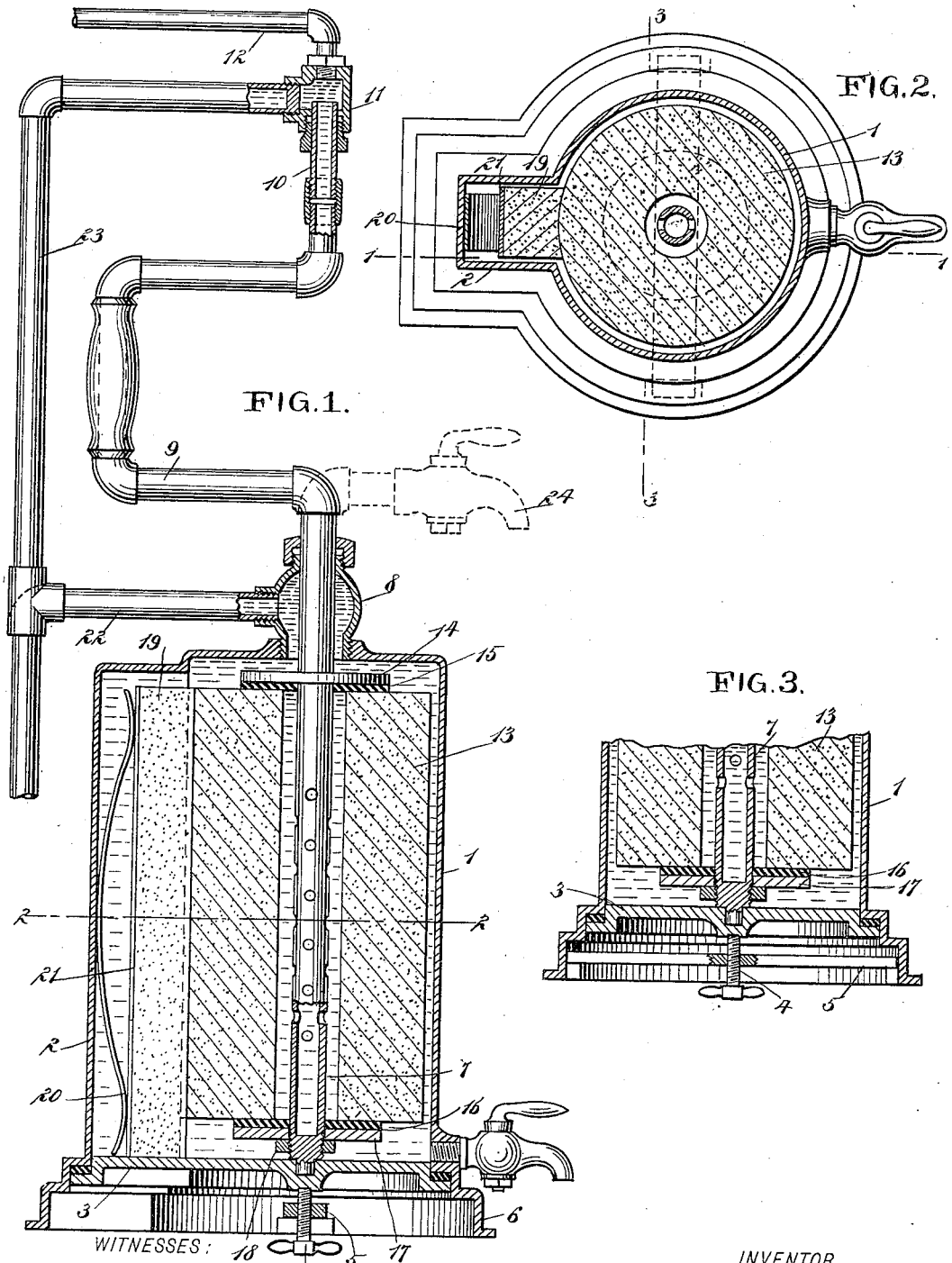
WITNESSES:
Donn Turtchell
C. R. Ferguson
INVENTOR
J. H. Sieber.
BY
ATTORNEYS.

UNITED STATES PATENT OFFICE.

JOHN H. SIEBER, OF HENDERSON, KENTUCKY, ASSIGNOR OF ONE-HALF TO WILLIAM A. REICHERT AND LOUISE PALIS EGARD, OF SAME PLACE.

FILTER.

SPECIFICATION forming part of Letters Patent No. 614,351, dated November 15, 1898.

Application filed March 11, 1898. Serial No. 673,480. (No model.)

*To all whom it may concern:*

Be it known that I, JOHN H. SIEBER, of Henderson, in the county of Henderson and State of Kentucky, have invented a new and Improved Filter, of which the following is a full, clear, and exact description.

This invention relates to filters for water under pressure; and the object is to provide a filter that will be comparatively cheap to manufacture and in which the filtering material may be easily cleaned without removing it from its casing.

I will describe a filter embodying my invention and then point out the novel features in the appended claims.

Reference is to be had to the accompanying drawings, forming a part of this specification, in which similar characters of reference indicate corresponding parts in all the views.

Figure 1 is a section on the line 1 1 of Fig. 2 of a filter embodying my invention. Fig. 2 is a section on the line 2 2 of Fig. 1, and Fig. 3 is a section on the line 3 3 of Fig. 2.

Referring to the drawings, 1 designates the filter-casing, having an offset 2 at one side. This casing has a removable bottom 3, held in place by means of a set-screw 4, engaging in a tapped hole in a cross-bar 5, removably secured in the base 6. Extended upward through the casing 1 and having a step-bearing in the bottom 3 is a perforated pipe 7. This pipe 7 extends through a globe 8, which communicates with the interior of the casing 1, and a cranked pipe 9 connects the upper end of the pipe 7 with a pipe 10, communicating with a water-receiver 11, from which a pipe 12 leads to a water-reservoir. The parts 7, 9, and 10 are practically one pipe, the angle or crank portion being provided for convenience in rotating the pipe 7, for a purpose to be hereinafter described.

Mounted on the pipe 7 is a filter material 13—such, for instance, as porous stone. This filter material is cylindrical and has a central opening through which the pipe 7 passes, the opening being somewhat larger than the pipe, so that a water-space is provided around the pipe. The filter material is rigidly connected to the pipe, so as to rotate therewith, by means of a metal washer 14, between which and the top of the filter material is a rubber or similar washer 15. A rubber or similar washer 16 engages with the bottom of the filter material and is held in place by a metal washer 17 and a nut 18, engaging with a screw-thread on the pipe 7.

Arranged in the offset 2 and engaging with the filter material 13 is a cleaning-stone 19. This stone 19 is held yieldingly against the filter material by means of a plate-spring 20, engaging at its central portion with the wall of the offset and at its ends with a metal plate 21, bearing on the stone.

A water-inlet pipe 22 leads into the globe 8, and from the inlet-pipe a brace-pipe 23 leads to a connection with the water-receiver 11. This brace-pipe may be omitted, as may also the crank-pipe 9, and a faucet 24 may be connected directly to the upper end of the pipe 7, as indicated in dotted lines in Fig. 1.

In operation the water will pass through the filter material 13 and into the pipe 7, and the water in passing through the filter material will be cleansed of all impurities. The outer surface of the filter material may be cleaned when necessary by rotating it against the stone 19.

The inlet for unfiltered water being directly over the filtering-stone causes water to shower over the entire surface of the stone, thus preventing the large accumulation of filtration necessarily deposited on stone of filters in which the water enters at the side. Therefore when water is drawn through the faucet at the bottom the surface of the stone will be partly cleaned or washed without aid from the cleaning-stone, thus preventing wear of the two stones.

Should the parts 19 or 20 be broken or otherwise rendered unfit for service, they may be removed without removing the filtering-stone by simply removing the bottom plate.

The manner of securing the bottom plate makes the construction much cheaper than in constructions where the bottom is screwed on, and there is no danger of leakage.

Having thus described my invention, I claim as new and desire to secure by Letters Patent—

1. A filter, comprising a casing, a removable bottom for the casing, a bar extended across the base of the casing, a screw engaging in said bar and holding the bottom, a pipe mounted to rotate in the casing and having a step bearing in said bottom, a filter material carried by the pipe and a cleaning device engaging with the filter material, substantially as specified.

2. A filter, comprising a casing, a removable bottom for the casing, a bar extended across the base of the casing, a set-screw engaging in said bar and holding the bottom and a filter material in the casing, substantially as specified.

JOHN H. SIEBER.

Witnesses:
R. SIDNEY EASTIN,
PETER GEIBEL.